Oct. 12, 1926.
C. A. HOMAN
DRAFTSMAN'S SCALE
Filed Jan. 6, 1925
1,602,490
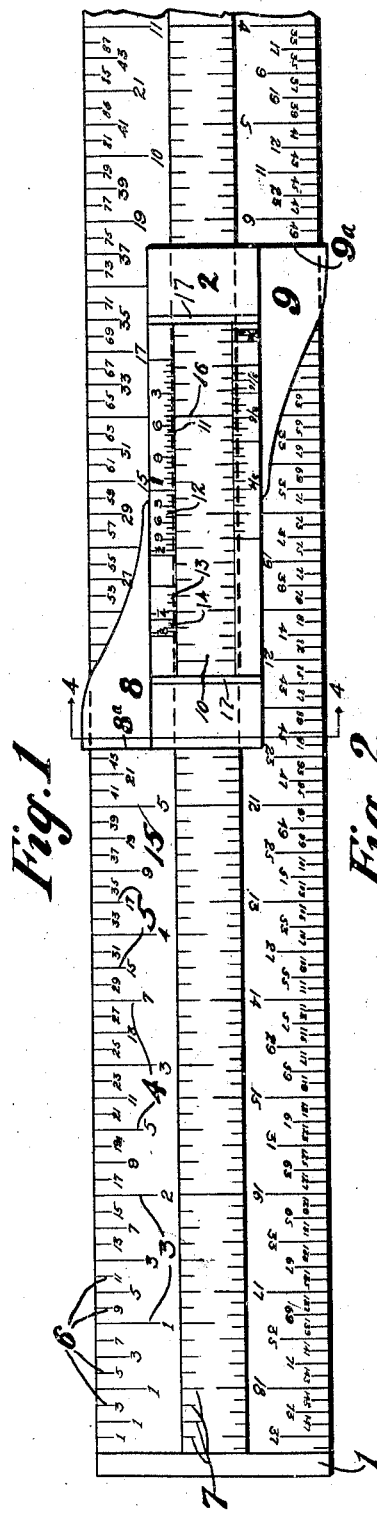
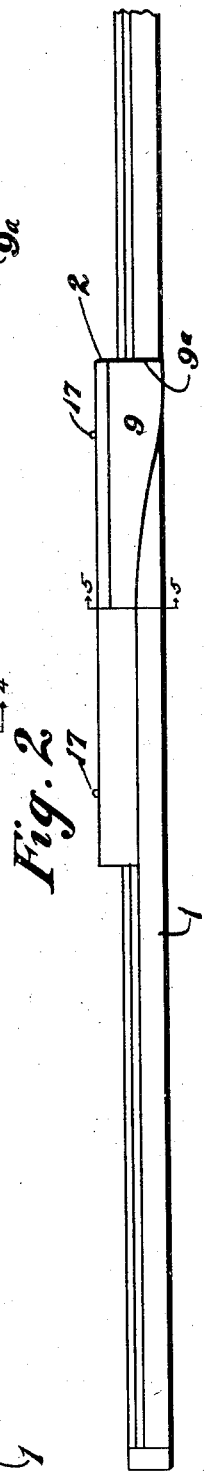
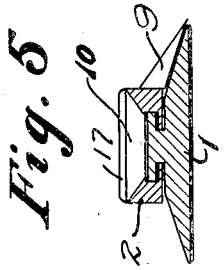
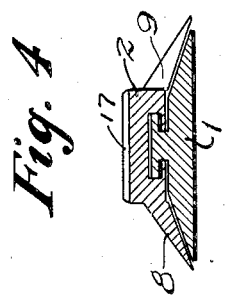
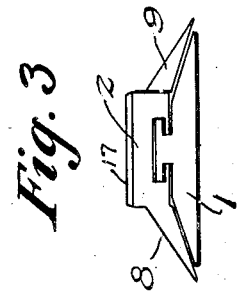
Inventor
Charles A. Homan
By Cornwall, Bedell & Janus
Att'ys.

Patented Oct. 12, 1926.

1,602,490

UNITED STATES PATENT OFFICE.

CHARLES A. HOMAN, OF ST. LOUIS, MISSOURI, ASSIGNOR TO WILLIAM C. HOMAN, OF ST. LOUIS, MISSOURI.

DRAFTSMAN'S SCALE.

Application filed January 6, 1925. Serial No. 754.

My invention relates to scales such as are used by architects and other draftsmen and consists in an improved arrangement and construction of such scales whereby their efficiency is increased and their use facilitated.

The object of my invention is to provide a scale in which a number of unit scales, such as indicate a series of feet, run concurrently starting from one end of the device, and in conjunction with said scales to provide a device in which a scale of sub-units, such as inches or fractions of inches, may be coordinated with the unit scales to combine any given number of feet or other units with any given number of inches less than a foot or other sub-units.

In the accompanying drawings which illustrate a selected embodiment of my invention,—

Figure 1 is a top view of my scale with one end broken away, it being understood that the scale may be of any desired length.

Figure 2 is a side elevation of the scale as shown in Figure 1.

Figure 3 is an end view of the same.

Figures 4 and 5 are vertical transverse sections on lines 4—4 and 5—5 of Figures 1 and 2, respectively.

My device comprises a base 1 and a slide 2. The base 1 has a flat bottom and is of substantial thickness between its sides to provide adequate rigidity but each edge is bevelled so that the top surface of each edge is adjacent the paper on which the scale is laid. Along each edge is a number of markings which form a plurality of unit scales, each scale indicating a number of feet; for instance, in the scale shown in Figure 1 the larger markings 3 indicate a unit scale in which divisions are one inch apart. The next size of markings 4 indicate a units scale in which the divisions are one-half inch apart, and the next two smaller markings 5 and 6, respectively, indicate units scale in which the markings are one-quarter of an inch and one-eighth of an inch, respectively.

It will be understood that each of the larger marks comprising scale 3 also forms a marking for all of the smaller scales, and the same statement is true of the markings of scales 4 and 5.

Parallel with the scales just described is a series of markings 7, each division of which is aligned with a corresponding marking on scales 3, 4, 5 and 6. These markings 7 are on the raised central portion of the device and do not bear any indicating numerals as they are not used for measuring from any given point but are only used in cooperation with the markings on the slide 2.

The slide 2 is shown as substantially rectangular in shape and provided with indicators 8 and 9 at diagonally opposite corners, which indicators extend downwardly and project beyond the beveled edges of the base of the device. It will be understood that the outer transverse edges $8^a$ and $9^a$ of indicators 8 and 9 are the portions utilized by the user of the device. The slide is provided with a rectangular opening 10, the sides of which are beveled as shown in Figure 5 and bear a series of sub-unit scales 11, 12, 13 and 14 each comprising a foot, on a respective one of the scales 3, 4, 5 or 6, sub-divided into inches or fractions of inches. It will be noted that these sub-unit scales 11, 12, 13 and 14 are not superimposed on one another or do not run concurrently with each other as do the unit scales 3, 4, 5 and 6 but are separated from each other.

The distance from the zero mark on each of the sub-unit scales 3, 4, 5, 6 to the transverse edge $8^a$ of the indicator 8 will be a multiple of one of the divisions along the corresponding edge of the base. Hence, whenever the edge $8^a$ of the indicator is aligned with one of the marks along the edge of the base, the zero mark of all of the scales 11, 12, 13 and 14 will be aligned with a corresponding division of markings 7. It will also be noted that the sub-unit scales run in the opposite direction from the unit scales.

With this construction in mind, it will be seen that to measure feet and inches on any one of the scales indicated, the user will shift the slide longitudinally of the base until the indicator $8^a$ is aligned with the number of feet to be measured. The user's eye will then note the marking 7 which is aligned with the zero mark of the desired sub-unit scale and will shift the sub-unit scale to the right to the extent necessary to bring the desired number of inches or fractions of inches to this particular marking 7. For instance, with the slide in the position shown, the device is marking five feet and five inches on the unit scale 3 which is one inch to the foot. In other words, with the indicator edge 8ª aligned with division 15 on the unit scale 11, the zero line of the sub-unit scale of one-inch-to-the-foot will be aligned with marking 16 of the line of markings 7. Moving the slide to the right so as to bring the fifth inch of sub-unit scale 11 into alignment with marking 16 moves the indicator edge 8ª to the right beyond marking 15 the distance of five inches on the one-inch-to-the-foot scale.

In the device illustrated, the capacity is doubled by utilizing opposite edges of the base and opposite sides of the rectangular opening in the slide to bear additional series of unit and sub-unit scales, the divisions on the lower side of the base and slide being shown as indicating scales of three-quarters, three-eighths, three-sixteenths and three-thirty-seconds of an inch to the foot, respectively.

Obviously, a less number of scales could be provided upon the edges, and other scales than those indicated could be marked thereon. If desired, the same scales could be marked on both edges of the base and the same sub-unit scales marked on both sides of the opening in the slide.

Preferably the numerals associated with the unit scales are in different colors and the corresponding sub-unit scales on the slide are similarly colored. For example, the numerals in unit scale 3 could be printed in red and the numerals and markings on sub-unit scale 11 could be printed in red. The numerals on unit scale 4 could be printed in blue and the corresponding sub-unit scale 12 could be printed in blue also. Similarly, the numerals of scales 5 and 6 could be printed in green and black, respectively, and the corresponding sub-unit scales 13 and 14 could be printed in green and black, respectively, also, or the sub-unit scales could be printed on distinctively colored backgrounds; for instance, the one inch scale could be printed on a red background, etc. This color system facilitates the use of the device but is not essential to the embodiment of my invention in its broader form.

I indicate ridges 17 on slide 2 near the opposite ends of opening 10 for ready engagement by the fingers of the user to move the slide along the base and to hold the slide at a set position while a mark is being made on the paper upon which the slide rests. It will be noted that the edges of indicator 8ª and 9ª form shoulders which may serve as stops for a pencil moving along the edge of the base to draw a line, thus eliminating the necessity of the draftsman making an indicating mark on the paper and then drawing a line to the mark. Obviously, these and other details of my device may be modified as desired, and I contemplate the exclusive use of all such as fall within the scope of my invention as defined in the accompanying claims.

I claim:

1. In a drafting scale, a base and a slide thereon, there being a unit scale marked on said base and a plurality of sub-unit scales marked on said slide and paralleling said unit scale and adapted to be selectively coordinated with said unit scale markings.

2. In a drafting scale, a base and a slide thereon, there being a series of markings indicating feet on said base and a parallel series of markings indicating inches or fractions of inches on said slide and means for coordinating said markings.

3. In a drafting scale, a base and a slide thereon, there being a unit scale marked on said base and a plurality of parallel sub-unit scales marked on said slide, said base and slide having markings whereby said unit and sub-unit scales may be coordinated.

4. In a drafting scale, a base and a slide thereon, there being a plurality of unit scales on said base running concurrently and a plurality of sub-unit scales on said slide in separated individual groups corresponding respectively to said unit scales, there being markings on said base and slide whereby scales on said base and slide may be coordinated.

5. In a drafting scale, a base and a slide thereon, there being a plurality of unit scales marked on said base and running concurrently in one direction and a plurality of sub-unit scales marked on said slide in separated individual group corresponding respectively to said unit scales and running in the opposite direction and there being markings on said base and slide whereby scales on said base and slide may be coordinated.

6. In a drafting scale, a base, there being a unit scale on said base and a series of marks on said base paralleling said unit scale and corresponding to the divisions thereof, a slide on said base, and an indicator on said slide, there being a sub-unit scale on said slide, the zero line of which is aligned with one of said marks when said indicator is aligned with one of the divisions of said unit scale.

7. In a drafting scale, a base, there being a plurality of unit scales running concurrently along the edge of said base and a series of marks on said base paralleling said scales and corresponding to all of the divisions of said scales, a slide on said base, and an indicator on said slide, there being a plurality of sub-unit scales on said slide, the zero line of each of which is aligned with a different one of said marks when said indicator is aligned with one of the divisions of said unit scale.

8. In a drafting scale, a base, there being a plurality of unit scales running concurrently along the edge of said base in one direction and a series of marks on said base paralleling said scales and corresponding to all of the divisions of said scales, a slide on said base, and an indicator on said slide, there being a plurality of sub-unit scales on said slide running in the opposite direction to said unit scales, the zero line of each of which sub-unit scales is aligned with a different one of said marks when said indicator is in alignment with one of the divisions of said unit scales.

9. In a drafting scale, a base having unit scales marked along its edge, and a slide mounted on said base and comprising an indicator extending transversely over said unit scales, there being sub-unit scales on said slide spaced from the working edge of said indicator, and means whereby said indicator may be accurately positioned between divisions of said unit scales.

10. In a drafting scale, a base having unit scales marked along opposite edges, and a slide mounted on said base, and comprising indicators each extending over one of said edges, there being a plurality of sub-unit scales on said slide whereby the working edges of either of said indicators may be accurately positioned between divisions of the unit scale over which it extends.

11. In a drafting scale, a base having a unit scale along its edge, there being markings paralleling said unit scale and spaced therefrom transversely of the base, and a slide on said base comprising an indicator extending across said unit scale and having an opening exposing said markings, the side of said opening bearing a sub-unit scale cooperating with said markings to assist the user in setting said indicator.

12. In a drafting scale, a base having a plurality of unit scales along its edge, there being markings paralleling the divisions of said unit scales and spaced therefrom transversely of the base, and a slide on said base comprising an indicator extending across said unit scale and having an opening exposing said markings, the side of said opening bearing a plurality of separated sub-unit scales, each cooperating with said markings to assist the user in setting said indicator.

13. In a drafting scale, a base having a unit scale along its edge, there being markings paralleling said unit scale and spaced therefrom transversely of the scale, and a slide on said base comprising a body having an indicator extending across said unit scale and having an opening with an upwardly and outwardly inclined side exposing said markings, there being a sub-unit scale on said slide cooperating with said markings to assist the user in setting said indicator.

14. In a drafting scale, a base, a slide thereon, there being a plurality of unit scales marked on said base, the indicating numerals of each of said scales being of a distinctive color, there being a plurality of sub-unit scales marked on said slide and separated from each other, said sub-unit scales being distinctively colored corresponding to the coloring of the unit scales with which they are associated.

15. In a drafting scale, a base, a slide thereon, there being a plurality of series of different unit scales on said base and a plurality of series of different sub-unit scales on said slide adapted to be coordinated with any one of the divisions of said unit scales.

16. In a drafting scale, a base having scale markings, a slide freely movable along said base when the latter is resting on a flat surface, a shoulder on said slide projecting transversely beyond the edge of said base to engage and position a pencil or the like while the latter is touching said surface, there being a plurality of different scales marked on said slide adapted to be selectively coordinated with said base scale markings to position said slide on said base.

17. In a drafting scale, a base having different incommensurable scale markings on different edges, a slide freely movable along said base when the latter is resting upon a flat surface, shoulders on said slide projecting, respectively, over said base edges to engage and position a pencil or the like while the latter is touching said surface, there being a plurality of scales marked on oppositely facing portions of said slide adapted to be respectively coordinated with said base scale markings to position said slide on said base.

18. In a drafting scale, a base having different incommensurable scale markings on different edges, a slide freely movable along said base when the latter is resting upon a flat surface, shoulders on said slide projecting, respectively, over said base edges to engage and position a pencil or the like while the latter is touching said surface, there being a plurality of scales marked on said slide, all reading in one direction, adapted to be selectively coordinated with scale markings on one edge of said base, and there being a plurality of other scales marked on said slide, all reading in the opposite direction and adapted to be selectively coordinated with scale markings on the other edge of said base.

In testimony whereof I hereunto affix my signature this 31st day of December, 1924.

CHAS. A. HOMAN.